United States Patent
Dhandapani et al.

(10) Patent No.: US 11,818,294 B2
(45) Date of Patent: *Nov. 14, 2023

(54) SELECTING A TARGET QUEUE FOR AN ELECTRONIC COMMUNICATION

(71) Applicant: Capital One Services, LLC, McLean, VA (US)

(72) Inventors: Selvakannan Dhandapani, Glen Allen, VA (US); Srividya Bodduluri, Glen Allen, VA (US); Gregory C. Deignan, Midlothian, VA (US); Casey M. Minner, Brightwood, VA (US); Christine H. Lindsey, Midlothian, VA (US); Narasimhan Mepperla, Moseley, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/185,553

(22) Filed: Mar. 17, 2023

(65) Prior Publication Data
US 2023/0224407 A1    Jul. 13, 2023

Related U.S. Application Data

(63) Continuation of application No. 17/659,344, filed on Apr. 15, 2022, now Pat. No. 11,616,881, which is a (Continued)

(51) Int. Cl.
*H04M 3/523* (2006.01)
*G06F 16/953* (2019.01)
(Continued)

(52) U.S. Cl.
CPC .......... *H04M 3/523* (2013.01); *G06F 16/906* (2019.01); *G06F 16/953* (2019.01); (Continued)

(58) Field of Classification Search
CPC ... G06F 16/953; G06F 16/906; G06Q 30/016; G06Q 30/0281; H04L 67/10; H04M 3/51; H04M 3/5166; H04M 3/523
(Continued)

(56) References Cited

U.S. PATENT DOCUMENTS

| | | |
|---|---|---|
| 5,991,392 A | 11/1999 | Miloslavsky |
| 6,553,113 B1 | 4/2003 | Dhir et al. |

(Continued)

*Primary Examiner* — Harry S Hong
(74) *Attorney, Agent, or Firm* — Harrity & Harrity, LLP

(57) ABSTRACT

In some implementations, a cloud computing system that executes a function may receive an indication of an electronic communication to occur between a customer and an agent. The cloud computing system that executes the function may determine a classification of the electronic communication based on a first set of rules stored in a database of the cloud computing system and attributes associated with the electronic communication. The cloud computing system that executes the function may select, based on the classification of the electronic communication, a target queue from a plurality of potential queues to be associated with the electronic communication based on a second set of rules stored in the database. The cloud computing system that executes the function may select the agent from a plurality of potential agents for the electronic communication based on an association between the agent and the target queue.

20 Claims, 9 Drawing Sheets

Related U.S. Application Data continuation of application No. 17/200,217, filed on Mar. 12, 2021, now Pat. No. 11,310,366.

(60) Provisional application No. 63/154,403, filed on Feb. 26, 2021.

(51) Int. Cl.
| | |
|---|---|
| *H04M 3/51* | (2006.01) |
| *G06Q 30/00* | (2023.01) |
| *G06Q 30/016* | (2023.01) |
| *G06Q 30/02* | (2023.01) |
| *G06F 16/906* | (2019.01) |
| *H04L 67/10* | (2022.01) |

(52) U.S. Cl.
CPC ....... *G06Q 30/016* (2013.01); *G06Q 30/0281* (2013.01); *H04M 3/5166* (2013.01); *H04L 67/10* (2013.01)

(58) Field of Classification Search
USPC .......................... 379/266.01, 266.02, 266.03
See application file for complete search history.

(56) References Cited

U.S. PATENT DOCUMENTS

| | | |
|---|---|---|
| 10,554,817 B1 | 2/2020 | Sullivan et al. |
| 11,310,366 B1 | 4/2022 | Dhandapani et al. |
| 11,616,881 B2 | 3/2023 | Dhandapani et al. |
| 2011/0255675 A1 | 10/2011 | Jasper et al. |
| 2017/0318157 A1 | 11/2017 | Shore |
| 2021/0092231 A1 | 3/2021 | Wu et al. |
| 2022/0279069 A1* | 9/2022 | Dhandapani ......... G06Q 30/016 |

* cited by examiner

SELECTING A TARGET QUEUE FOR AN ELECTRONIC COMMUNICATION

CROSS-REFERENCE TO RELATED APPLICATIONS

This application is a continuation of U.S. patent application Ser. No. 17/659,344, filed Apr. 15, 2022 (now U.S. Pat. No. 11,616,881), which is a continuation of U.S. patent application Ser. No. 17/200,217, filed Mar. 12, 2021 (now U.S. Pat. No. 11,310,366), which claims priority to U.S. Provisional Patent Application No. 63/154,403, filed on Feb. 26, 2021, and entitled "SELECTING A TARGET QUEUE FOR AN ELECTRONIC COMMUNICATION," the contents of which are incorporated herein by reference in their entireties.

BACKGROUND

A call center may allow agents that work at the call center to electronically communicate with customers. For example, customers may electronically communicate with agents at the call center for product or service support or for information enquiries. Electronic communications between the agents and the customers may be via telephone, electronic mail, and/or electronic instant messaging. A customer that initiates an electronic communication may be placed in a queue before being matched with an available agent.

SUMMARY

In some implementations, a system for selecting target queues for electronic communications includes one or more memories and one or more processors, communicatively coupled to the one or more memories, configured to: receive, from an interactive voice response (IVR) system and at a cloud computing system that executes a function, an indication of an electronic communication to occur between a customer and an agent; determine, using the cloud computing system that executes the function, a classification of the electronic communication based on a first set of rules stored in a database of the cloud computing system and attributes associated with the electronic communication, wherein the attributes indicate an identify of the customer associated with the electronic communication, an objective of the electronic communication, and features associated with the customer, and wherein the function and the database are external to a contact center system that establishes the electronic communication; select, using the cloud computing system that executes the function and based on the classification of the electronic communication, a target queue from a plurality of potential queues to be associated with the electronic communication based on a second set of rules stored in the database, wherein the target queue is associated with the objective of the electronic communication and the features associated with the customer; determine, using the cloud computing system that executes the function, an event to occur while the electronic communication is associated with the target queue based on a third set of rules stored in the database; transmit, to the contact center system, an indication of the event to occur while the electronic communication is associated with the target queue; select, using the cloud computing system that executes the function, the agent from a plurality of potential agents for the electronic communication based on an association between the agent and the target queue; and transmit, to the contact center system, an instruction to establish the electronic communication between the customer and the agent.

In some implementations, a method of selecting target queues for electronic communications includes receiving, at a cloud computing system that executes a function, an indication of an electronic communication to occur between a customer and an agent; determining, using the cloud computing system that executes the function, a classification of the electronic communication based on a first set of rules stored in a database of the cloud computing system and attributes associated with the electronic communication, wherein the function and the database are not associated with a contact center system that establishes the electronic communication; selecting, using the cloud computing system that executes the function and based on the classification of the electronic communication, a target queue from a plurality of potential queues to be associated with the electronic communication based on a second set of rules stored in the database; selecting, using the cloud computing system that executes the function, the agent from a plurality of potential agents for the electronic communication based on an association between the agent and the target queue; and transmitting, to the contact center system, an instruction to establish the electronic communication between the customer and the agent.

In some implementations, a non-transitory computer-readable medium storing a set of instructions includes one or more instructions that, when executed by one or more processors of a device, cause the device to: receive, at a cloud computing system that executes a function, an indication of an electronic communication to occur between a customer and an agent; determine, using the cloud computing system that executes the function, a classification of the electronic communication based on a first set of rules stored in a database of the cloud computing system and attributes associated with the electronic communication, wherein the function and the database are external to a contact center system that establishes the electronic communication; select, using the cloud computing system that executes the function and based on the classification of the electronic communication, a target queue from a plurality of potential queues to be associated with the electronic communication based on a second set of rules stored in the database; determine, using the cloud computing system that executes the function, an event to occur while the electronic communication is associated with the target queue based on a third set of rules stored in the database; transmit, to the contact center system, an indication of the event to occur while the electronic communication is associated with the target queue; select, using the cloud computing system that executes the function, the agent from a plurality of potential agents for the electronic communication based on an association between the agent and the target queue; and transmit, to the contact center system, an instruction to establish the electronic communication between the customer and the agent.

DETAILED DESCRIPTION

Figure 1A:
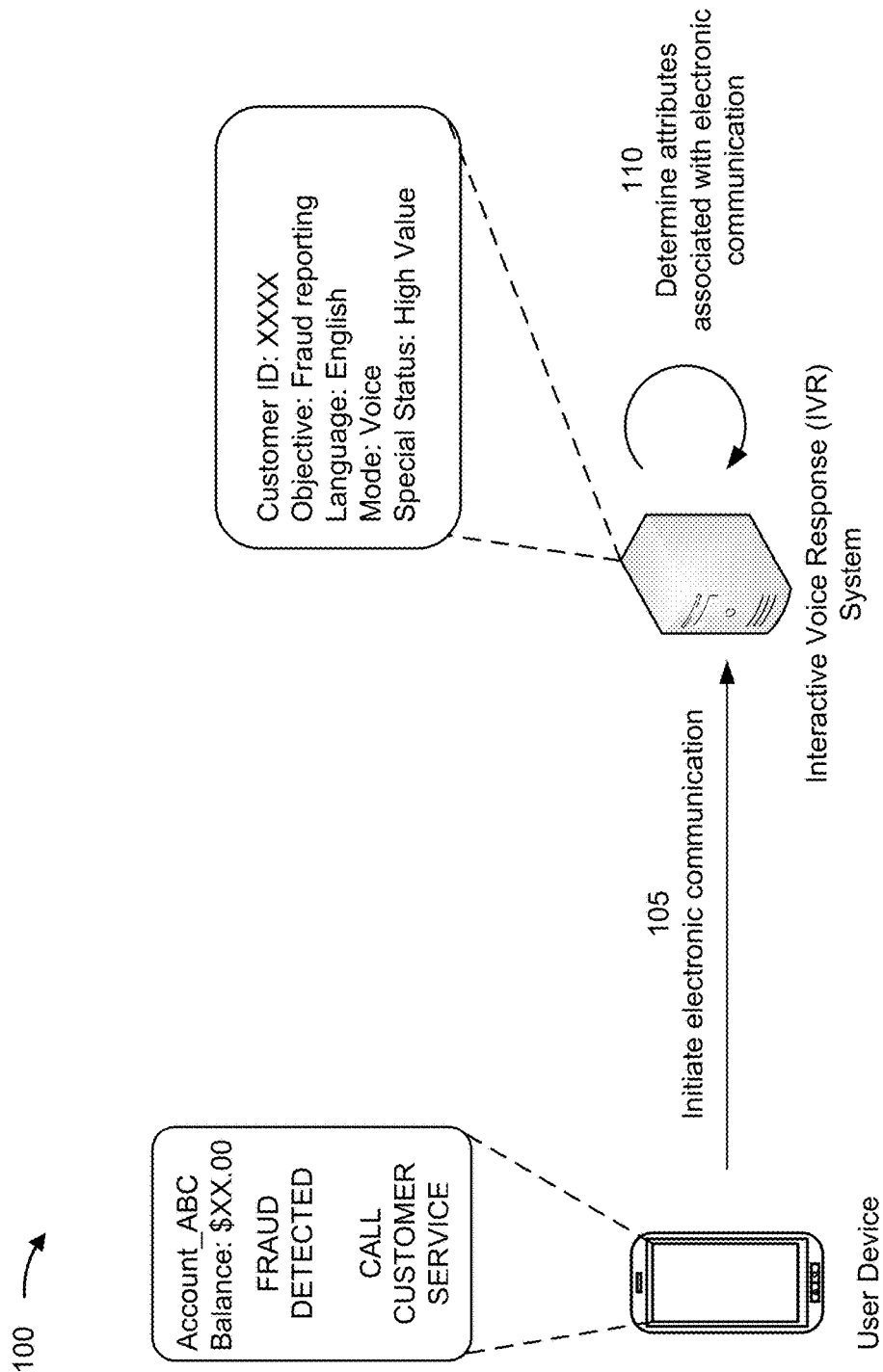
FIGS. 1A-1F are diagrams of an example implementation relating to selecting a target queue for an electronic communication.

The following detailed description of example implementations refers to the accompanying drawings. The same reference numbers in different drawings may identify the same or similar elements.

A call center or virtual call center may allow agents that work at the call center to communicate with customers. For example, when the call center is an inbound call center, a customer device associated with a customer may communicate with an agent device associated with an agent for product or service support or for information enquiries. In another example, when the call center is an outbound call center, the agent device may communicate with the customer device for purposes of telemarketing, solicitation of charitable or political donations, debt collection, market research, emergency notifications, etc. Electronic communications between the agent device and the customer device may be via telephone, electronic mail, and/or electronic instant messaging.

A customer that initiates an electronic communication with an inbound call center for a specific purpose (e.g., fraud reporting) may be placed in a queue with other waiting customers. When an agent at the call center becomes available, the customer that is waiting in the queue may be matched with an available agent. The available agent may be qualified to handle electronic communications on that queue. After being added to queues, customers may be matched with available agents in a first-come, first-served basis, such that a customer that has been waiting the longest period of time on that queue as compared to other customers on that queue may be first in line to be matched with the next available agent.

A contact center system that executes in a cloud computing system may provide an omnichannel cloud contact center. The contact center system may establish electronic communications (e.g., voice, video, and/or chat) between customers and agents. The contact center system may receive an indication of an electronic communication initiated by a customer, add the customer to a queue, and then route the customer to an available agent, such that the electronic communication may be established to involve the customer and the agent. The contact center system may implement a series of rules for classifying customers and adding the customers to queues, before the customers are matched with available agents. The rules may involve directing an electronic communication initiated by a customer to an appropriate queue based on an objective associated with the electronic communication (e.g., fraud reporting), and then identifying an agent associated with that queue and that is available to be associated with the electronic communication to aid the customer. The rules may be defined by a client (e.g., a financial services company) of the contact center system that is using the contact center system to provide customer services to customers of the client.

The client may wish to update the rules and/or attributes for identifying queues and routing electronic communications to available agents. For example, the client may wish to modify a rule that redirects a customer from a first queue to a second queue when a number of customers that are currently waiting in the first queue satisfies a threshold. The rule may specify a maximum queue limit, at which point customers may be routed to an alternate queue. As another example, a queue may have attributes indicating that the queue is related to fraud reporting for Spanish speakers, and the client may wish to split the queue into a first queue and a second queue. The first queue may have attributes indicating that the first queue is related to fraud reporting for high-value Spanish speakers, and the second queue may have attributes indicating that the second queue is related to fraud reporting for normal-value Spanish speakers.

When updating the rules and/or attributes for identifying the queues and routing the electronic communications to the available agents, an interface provided by the contact center system may be accessed by the client. The interface may provide the client with a mechanism to input updated rules and/or attributes associated with a plurality of possible queues. However, such rules and/or attributes may be hard-coded in the contact center system, and updating the rules and/or attributes may be a time-consuming process and may involve manually replicating updates across different regions. Such updates may need to be performed after hours (e.g., after 10 PM) to minimize a downtime impact to customers. Production changes involving a relatively large update to existing rules and/or attributes may take a relatively large amount of time and manpower due to the rigidity of the contact center system.

In some implementations described herein, to solve the problems described above, as well as a related technical problem of how to create a classification and routing logic for electronic communications between customers and agents that does not involve hard-coding rules and/or attributes into a contact center system that is involved in classifying and routing an electronic communication to an appropriate agent, a technical solution is described herein for configuring a cloud computing system to execute a function that is triggered to launch when an electronic communication is initiated by a customer. The function may access a database in the cloud computing system that stores rules for classifying and routing electronic communications. The function that executes in the cloud computing system, and the database that stores the rules, may both be external to the contact center system that actually establishes the electronic communication for the customer. The sets of rules may be divided into three sets of rules, where each set of rules may represent a hierarchical layer of rules. For example, a first set of rules may relate to classifying the electronic communication. A second set of rules may relate to selecting a target queue for the electronic communication. A third set of rules may relate to determining events to occur while the customer is waiting in the target queue. The function may retrieve the rules from the database and execute the rules to classify the electronic communication and select the target queue for the electronic communication. Further, the function may select an agent to be assigned to the electronic communication based on the target queue associated with the electronic communication. The function may instruct the contact center system to establish the electronic communication with the agent selected based on the target queue.

In some implementations, the contact center system may not be involved in classifying the electronic communication and assigning the target queue to the electronic communication. Rather, when a new electronic communication is initiated by a customer, an execution of a function in the cloud computing system may be triggered, and that function may be specific to the new electronic communication that has been initiated by the customer. The contact center system may simply receive an indication of an agent that has been selected for the electronic communication, and at that point, the contact center system may establish the electronic communication between the customer and the agent.

Typically, the contact center system may perform the classification and routing of electronic communications to target queues, but this approach involves hard-coding rules related to the classification and routing directly into the contact center system. As a result, making updates to the hard-coded rules may be burdensome and costly.

In some implementations, the rules and/or attributes for classifying the electronic communications and routing the electronic communications to target queues may be maintained in a database that is external to the contact center system. Updates to the rules and/or attributes may easily be made via an interface to the database, as opposed to making the updates through the contact center system. As a result, modifications to the rules and/or attributes may be made more easily, thereby leading to more frequent improvements, which reduces a number of transfers (e.g., an agent transferring an electronic communication to another agent that is more appropriate to handle the matter) due to incorrect classification and targeting logic. The reduction in the number of transfers due to incorrect classification and targeting logic may reduce an amount of computing and storage resources attributed to the client when the client is using the contact center system to provide customer support for customers.

FIGS. 1A-1F are diagrams of an example implementation 100 relating to selecting a target queue for an electronic communication. As shown in FIGS. 1A-1F, example implementation 100 includes a cloud computing system, a user device, an IVR system, a contact center system, an agent device, and a developer system. These devices are described in more detail in connection with FIGS. 2 and 3.

As shown in FIG. 1A, and by reference number 105, a user device associated with a customer may initiate an electronic communication. The user device may initiate the electronic communication so that the customer may receive some type of service, such as technical support, fraud reporting, or other reasons. The user device may communicate with an IVR system to initiate the electronic communication. For example, the user device may transmit an indication of the electronic communication initiated by the user device to the IVR system. The electronic communication may be to occur between the customer and an agent that is selected to service the customer. The electronic communication may be a voice-based communication between the customer and the agent, a video-based communication between the customer and the agent, and/or a text-based communication between the customer and the agent.

As an example, the user device may receive a notification (e.g., an electronic message or a text message) that indicates that fraud has been detected in a customer account. The user device may call a customer service number so that the customer may speak with an agent. After the customer service number is called by the user device, an indication may be transmitted to the IVR system.

As shown by reference number 110, the IVR system may determine attributes associated with the electronic communication initiated by the user device. The IVR system may determine the attributes based on prompting the user device to provide answers to various questions, such as questions related to a customer name or identifier, verification information, address and telephone number information, electronic message address information, a reason for initiating the electronic communication, features associated with the customer (e.g., member of a loyalty program and/or a high value customer), and other various attributes. As a result, the IVR may determine the attributes associated with the electronic communication initiated by the user device, such as the identity of the customer, an objective of the electronic communication, and/or the features associated with the customer.

In some implementations, the IVR system may identify customer identification information (e.g., a phone number and a verification pin number) based on an input received from the user device, and the IVR system may access a database to retrieve attributes about the customer based on the customer identification information. For example, the database may include information related to the customer's account information, account transaction information, account balance information, etc. Further, the database may indicate various features associated with the customer, such as whether the customer is part of a loyalty program or is a high value customer. As a result, the user device may not need to provide customer information that is already stored in the database, and the IVR system may more quickly gather pertinent information about the customer.

As an example, the IVR system may determine, for a given customer that initiated a call to speak with an agent, that the customer is associated with a certain customer identifier, an objective of the call is for fraud reporting, a language that the customer speaks is English, a mode of communication is voice (e.g., the user device is making a voice-based call, as opposed to a video call or a text communication), and that the customer is a high value customer (e.g., the customer spends an amount of money per year that satisfies a threshold, which may qualify the customer to obtain certain perquisites ("perks")).

Figure 1B:
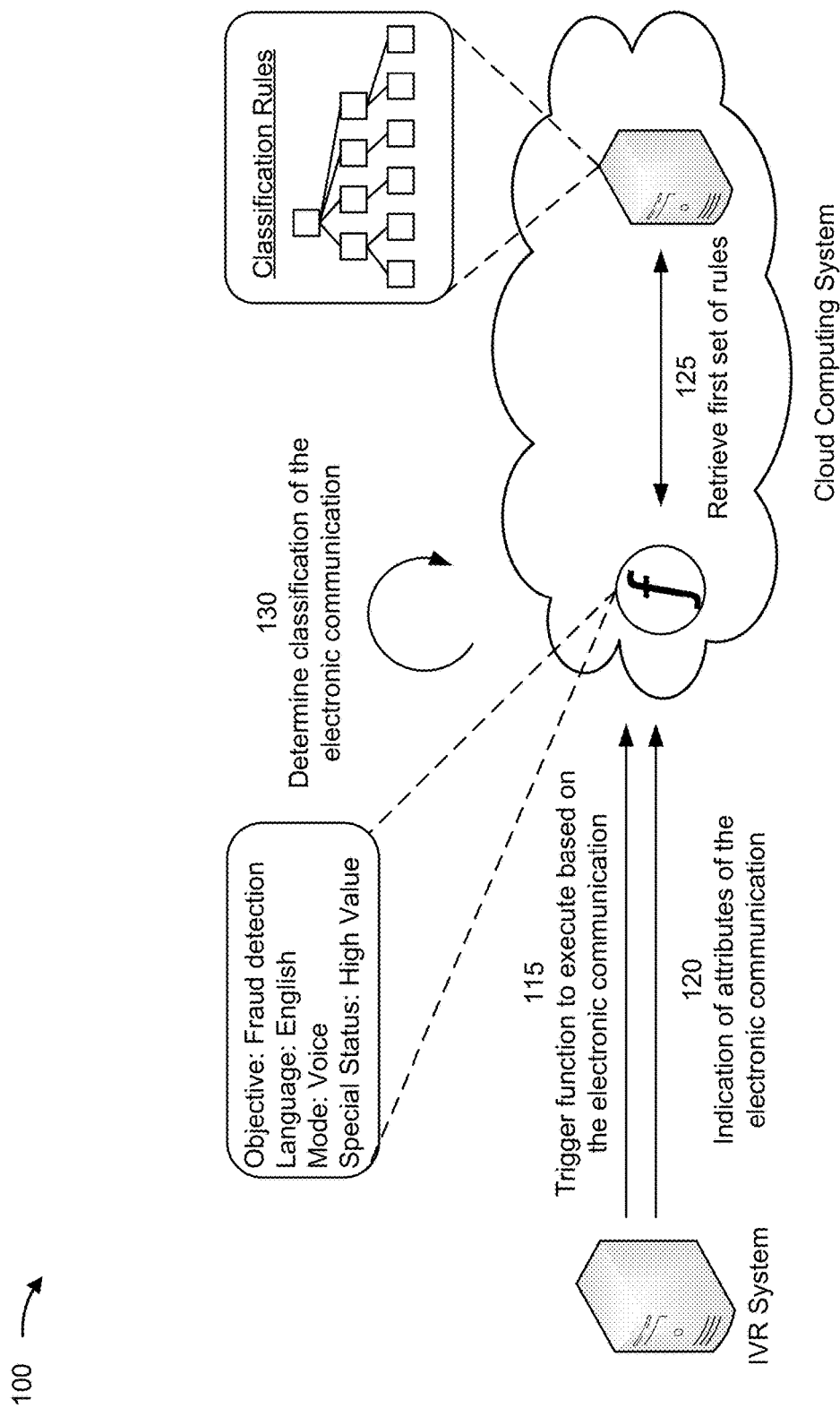

As shown in FIG. 1B, and by reference number 115, the IVR system may trigger, based on the indication of the electronic communication initiated by the user device, a cloud computing system to execute a function responsible for classifying the electronic communication, selecting a target queue based on the electronic communication, and selecting an agent that is available and skilled to be assigned to the electronic communication with the customer. In other words, the function may be triggered to execute in the cloud computing system based on an initiation of the electronic communication by the user device. The function may be specific to the electronic communication to occur between the customer and the agent. Separate functions may be triggered for each new electronic communication that is initiated by user devices.

In some implementations, the function may be a code function that is executed using hardware and/or software elements of the cloud computing system. The function may be triggered to execute based on an occurrence of an event, such as an initiation of an electronic communication by a user device. The function may be configured to perform various operations, such as classifying the electronic communication, selecting the target queue, and/or selecting the agent. The function may be configured to perform operations on data, such as transformations, aggregations, and/or filtering, to obtain the classifications, the target queues, and/or the agent selections. The function may be portions of code that may be executed using the hardware and/or software elements of the cloud computing system. The function may be segments of program code that are capable of receiving parameters, processing the data, and returning values. The function may be written in a high level programming language, a scripting language, or a combination thereof. The function may be instantiated in a container hosted in the cloud computing system.

In some implementations, the function that executes in the cloud computing system may be independent from and not associated with the contact center system. As will be discussed in further detail, the contact center system may receive, from the function, an indication of a selected agent to be associated with the electronic communication, and the contact center system may establish the electronic communication between the user device and the agent device. In other words, the contact center system that ultimately establishes the electronic communication may not actually be responsible for classifying the electronic communication, selecting the target queue based on the electronic communication, and selecting the agent to partake in the electronic communication. Rather, the function that executes in the cloud computing system, which is separate from the contact center system, may perform such operations.

In some implementations, the indication of the electronic communication initiated by the user device may directly trigger the cloud computing system to execute the function. In some implementations, the indication may be sent to another entity, such as a networking device or a load balancer, at which point the execution of the function may be triggered.

As shown by reference number 120, the IVR system may transmit an indication of the attributes of the electronic communication to the function executing in the cloud computing system. For example, the indication may indicate, to the function, the identity of the customer, the objective of the electronic communication, and/or the features associated with the customer.

In some implementations, the IVR may store the attributes of the electronic communication in a cache. When the function is triggered to execute in the cloud computing system, the function may retrieve the attributes of the electronic communication from the cache.

As shown by reference number 125, the function executing in the cloud computing system may retrieve a first set of rules from a database in the cloud computing system. The first set of rules may be classification rules. In other words, the first set of rules may be related to classifying the electronic communication initiated by the user device and/or classifying the customer that is using the user device to initiate the electronic communication.

In some implementations, the database may be a non-relational database that supports key-value and document data structures. The database may be replicated across different geographic regions. In other words, the database may provide cross-region read and write replication. For example, a first database in a first geographic region may be synchronized with a second database in a second geographic region, such that changes to the first database may also be made in the second database. The database may automatically scale tables up and down to adjust for capacity and maintain performance. The database may provide both provisioned and on-demand capacity modes. The database may be accessible as part of a managed service that operates in the cloud computing system.

In some implementations, the database that stores the first set of rules (as well as second and third sets of rules related to queue targeting and a contact flow, respectively) may be independent from and not associated with the contact center system. In other words, the contact center system that ultimately establishes the electronic communication may not actually maintain rules used for classifying the electronic communication, selecting the target queue based on the electronic communication, and selecting the agent to partake in the electronic communication. Rather, the database in the cloud computing system, which is separate from the contact center system, may store the rules to enable the cloud computing system to establish the electronic communication.

In some aspects, the function that executes in the cloud computing system and the database that stores the sets of rules may be associated with a client of the contact center system. For example, the client (e.g., a financial services company) may use the contact center system to handle customer service communications. In other words, the function may be configured to execute in the cloud computing system, and the database may be configured to store the sets of rules based on instructions from the developer system associated with the client.

As shown by reference number 130, the function executing in the cloud computing system may determine a classification of the electronic communication. The function executing in the cloud computing system may determine the classification based on the first set of rules retrieved from the database of the cloud computing system and the attributes associated with the electronic communication, such as the identity of the customer associated with the electronic communication, the objective of the electronic communication, and the features associated with the customer.

In some implementations, the function may run the first set of classification rules against the attributes associated with the electronic communication in order to determine the classification of the electronic communication. As an example, the first set of classification rules may include hundreds of separate rules that are run to classify who the customer is that is associated with the electronic communication, the objective of the electronic communication, and/or whether there are specific features associated with the customer that would change how the customer is routed to a particular queue and agent.

As an example, the function executing in the cloud computing system may classify, based on the first set of classification rules and the attributes associated with the electronic communication, the electronic communication as being associated with an objective related to fraud detection, a customer language of English, a mode of communication as voice, and/or a presence of a special status for the customer (e.g., the customer is a high value customer that annually spends an amount of money that satisfies a threshold).

As another example, the function executing in the cloud computing system may classify, based on the first set of classification rules and the attributes associated with the electronic communication, the electronic communication as being associated with an objective or a reason that the electronic communication was transferred by the IVR system (e.g., fraud), a language spoken by the customer (e.g., Spanish), and/or a business sub-unit (e.g., identity fraud or transaction fraud).

Figure 1C:
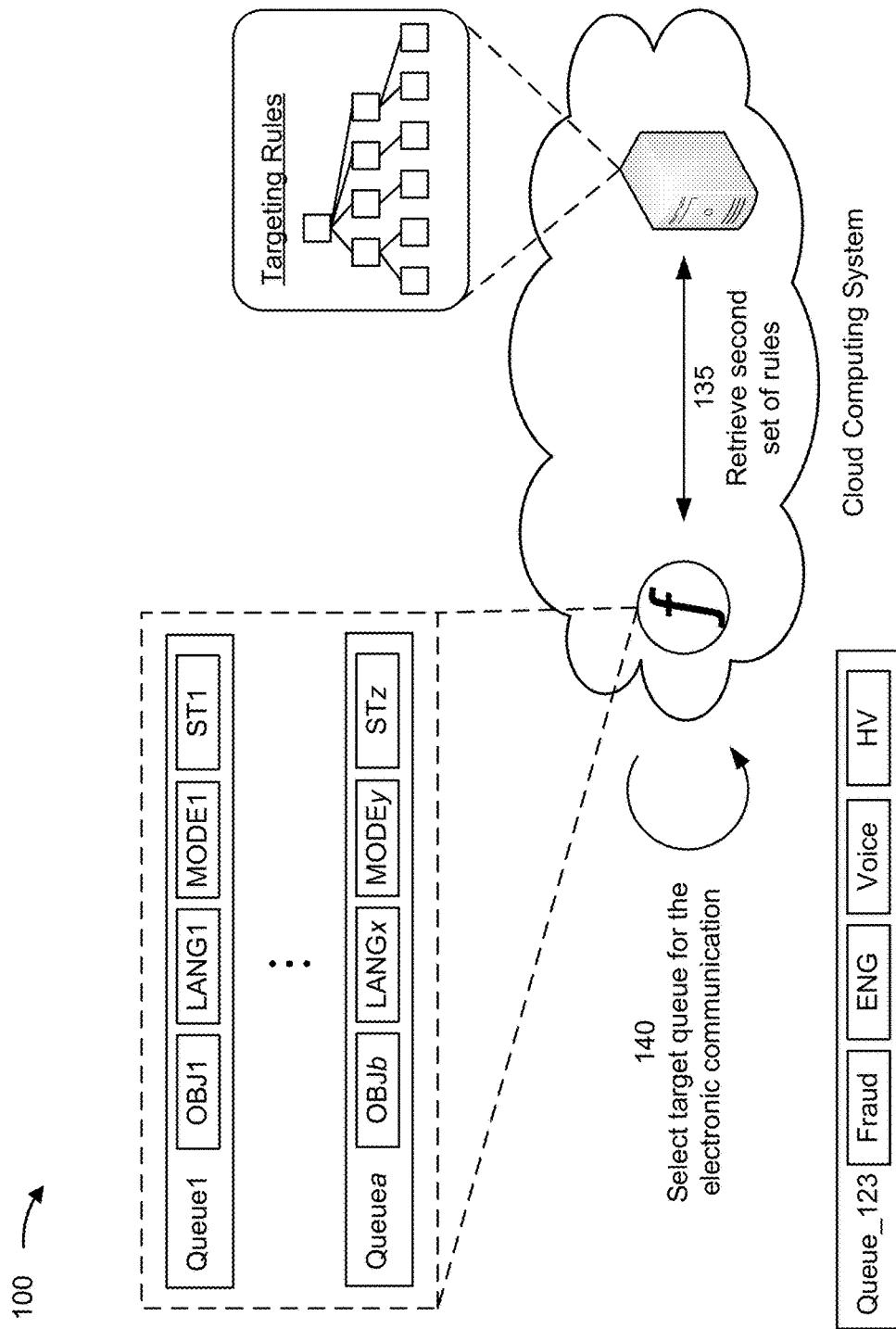

As shown in FIG. 1C, and by reference number 135, the function executing in the cloud computing system may retrieve a second set of rules from the database in the cloud computing system. The second set of rules may be targeting rules used for identifying a target queue for the electronic communication. In other words, the second set of rules may be related to identifying an appropriate queue that corresponds to the electronic communication.

As shown by reference number 140, the function executing in the cloud computing system may select a target queue to be associated with the electronic communication. The function executing in the cloud computing system may select the target queue based on the classification of the electronic communication. In other words, after the electronic communication is classified, the electronic communication may be assigned to an appropriate target queue. The function executing in the cloud computing system may select the target queue from a plurality of potential queues based on the second set of rules retrieved from the database. The target queue may be associated with the objective of the electronic communication and the features associated with the customer.

In some implementations, the function executing in the cloud computing system may select the target queue based on an association between the attributes associated with the electronic communication and attributes associated with the target queue. The attributes for each of the plurality of potential queues may be stored in the database. The attributes may define a purpose or objective for each of the plurality of potential queues, and each queue may be associated with a unique set of attributes. For example, the function executing in the cloud computing system may compare the attributes associated with the electronic communication (e.g., objective, language, communication mode, and special status) with the attributes associated with each of the plurality of potential queues, and based on the comparison and the second set of rules, the function executing in the cloud computing system may identify the target queue having similar attributes as the electronic communication. In other words, each of the plurality of potential queues may be associated with different attributes, and the target queue having attributes that correspond to the attributes (or are closest to the attributes) of the electronic communication may be selected.

As an example, the function executing in the cloud computing system may compare the electronic communication having attributes of an objective related to fraud reporting, a language of English, a communication mode of voice, and a special status of high value customer to a plurality of potential queues. Each of the plurality of potential queues may be associated with attributes relating to an objective of a certain queue, a language associated with the certain queue, a communication mode associated with the certain queue, and a special status associated with the certain queue. The function executing in the cloud computing system may identify, based on the comparison and the second set of rules, a particular queue having an objective related to fraud reporting, a language of English, a communication mode of voice, and a special status of high value.

In some implementations, the function executing in the cloud computing system may select the target queue based on real-time metrics indicating current lengths of potential target queues in the plurality of potential queues. The function executing in the cloud computing system may access the real-time metrics from the database. The real-time metrics, which may be updated in real-time or near real-time (e.g., every five seconds), may indicate, for each of the plurality of potential queues, a current occupancy level. The function executing in the cloud computing system may perform load balancing when selecting between similar queues, such that one queue may not become overloaded.

In some implementations, the function executing in the cloud computing system may initially identify multiple queues that are associated with the electronic communication. The function executing in the cloud computing system may reduce the multiple queues to a single queue based on a best match between the attributes of the electronic communication and attributes of the queues, real-time metrics that indicate current wait times for each of the multiple queues, agent availability, etc.

As an example, the function executing in the cloud computing system may identify a queue having an objective related to fraud reporting, a language of English, a communication mode of voice, and a special status of high value. However, a current occupancy level of that queue may satisfy a threshold (e.g., the current occupancy level may be greater than 85%). Rather than add another electronic communication to that queue, the function executing in the cloud computing system may identify another queue having an objective related to fraud prevention instead of fraud reporting, a language of English, a communication mode of voice, and a special status of high value. However, since the other queue is relatively similar to the queue for fraud reporting and most agents that are qualified to handle electronic communications related to fraud reporting are also qualified to handle electronic communications related to fraud prevention, the function executing in the cloud computing system may select the queue related to fraud prevention as the target queue.

Figure 1D:
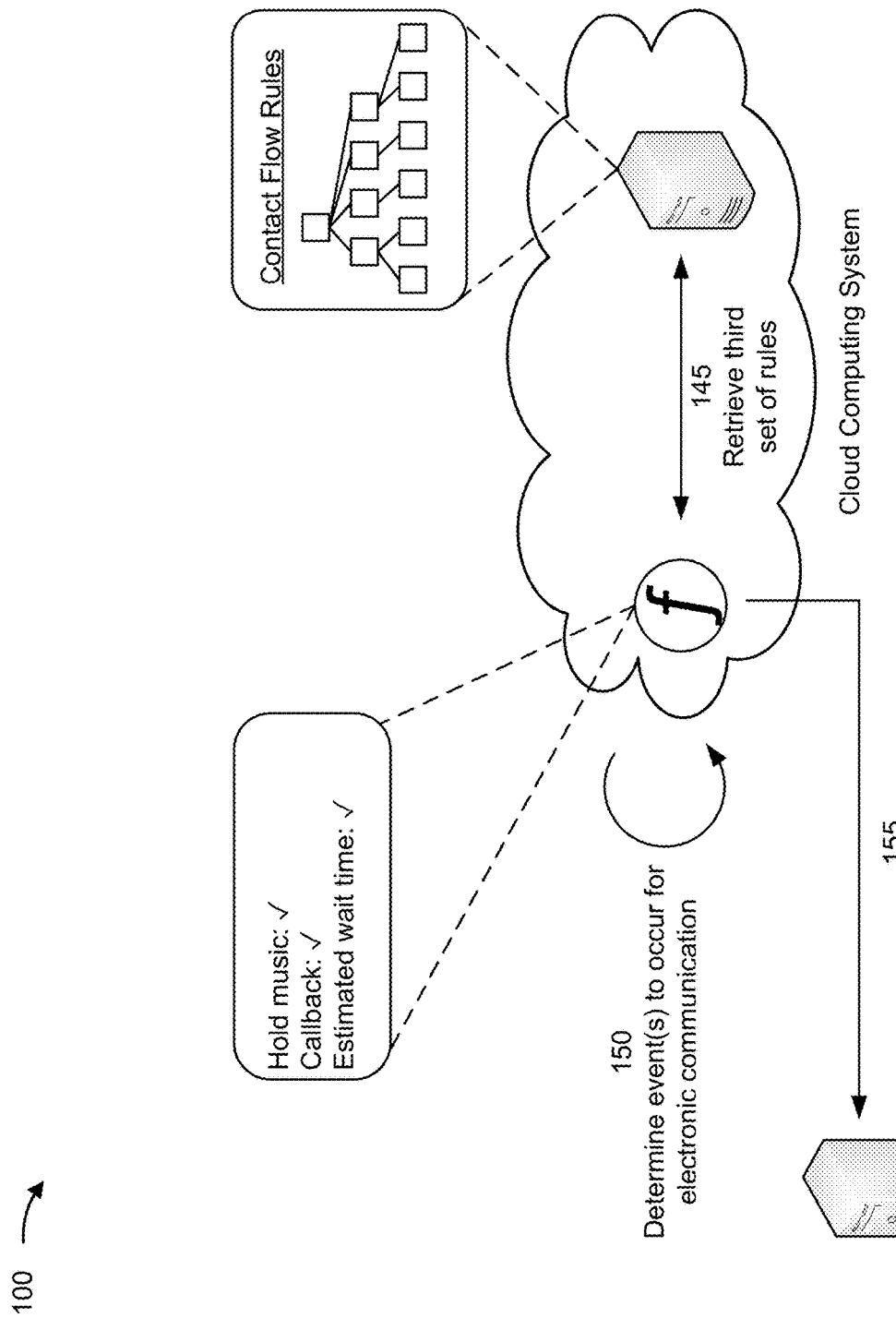

As shown in FIG. 1D, and by reference number 145, the function executing in the cloud computing system may retrieve a third set of rules from the database in the cloud computing system. The third set of rules may be contact flow rules used for identifying an event to occur while the electronic communication is associated with the target queue. The event may affect an experience of the customer when waiting for the agent to join the electronic communication.

As an example, the event to occur while the electronic communication is associated with the target queue may be a playback of hold music. The hold music may be associated with the objective of the electronic communication. As another example, the event may be playback of advertisements or notifications associated with the objective of the electronic communication. As another example, the event may be a notification that the customer qualifies for a callback, for example, depending on the objective of the electronic communication and/or a special status of the customer. As another example, the event may be a playback of an estimated wait time, and may depend on the objective of the electronic communication.

As shown by reference number 150, the function executing in the cloud computing system may determine events to occur while the electronic communication is associated with the target queue based on the third set of rules retrieved from the database. The function executing in the cloud computing system may determine the events after the target queue is selected for the electronic communication.

In some examples, the first set of rules, the second set of rules, and/or the third set of rules may be specific to a line of business, such as fraud, collections, services, recovery, etc. In other words, sets of rules for classifying the electronic communication, selecting the target queue based on the electronic communication, and determining events to be associated with the electronic communication may be specific to different lines of business. The database may be partitioned by sets of rules based on rule type (e.g., classification, targeting, or events) and/or based on the line of business.

As an example, the function executing in the cloud computing system may determine, based on the third set of rules and the attributes associated with the electronic communication, that the electronic communication qualifies for events related to playback of hold music, an audio notification that a customer callback feature is available, and/or an audio indication of an estimated wait time. The events may have a positive impact on an experience of the customer when waiting for the agent to join the electronic communication.

As shown by reference number 155, the function executing in the cloud computing system may transmit, to the contact center system, an indication of the events to occur while the electronic communication is associated with the target queue. Since the contact center system may manage the electronic communication while the electronic communication is associated with the target queue, the contact center system may implement the events based on the indication received from the function executing in the cloud computing system. For example, the contact center system may access a database, which may be associated with the contact center system, to retrieve hold music for playback. As another example, the contact center system may generate audio notifications related to the customer callback feature and/or the estimated wait time. The contact center system may provide such events to the user device when the user device is associated with the target queue. In other words, the contact center system may provide such events to the user device while the customer is waiting for the agent to join the electronic communication.

Figure 1E:
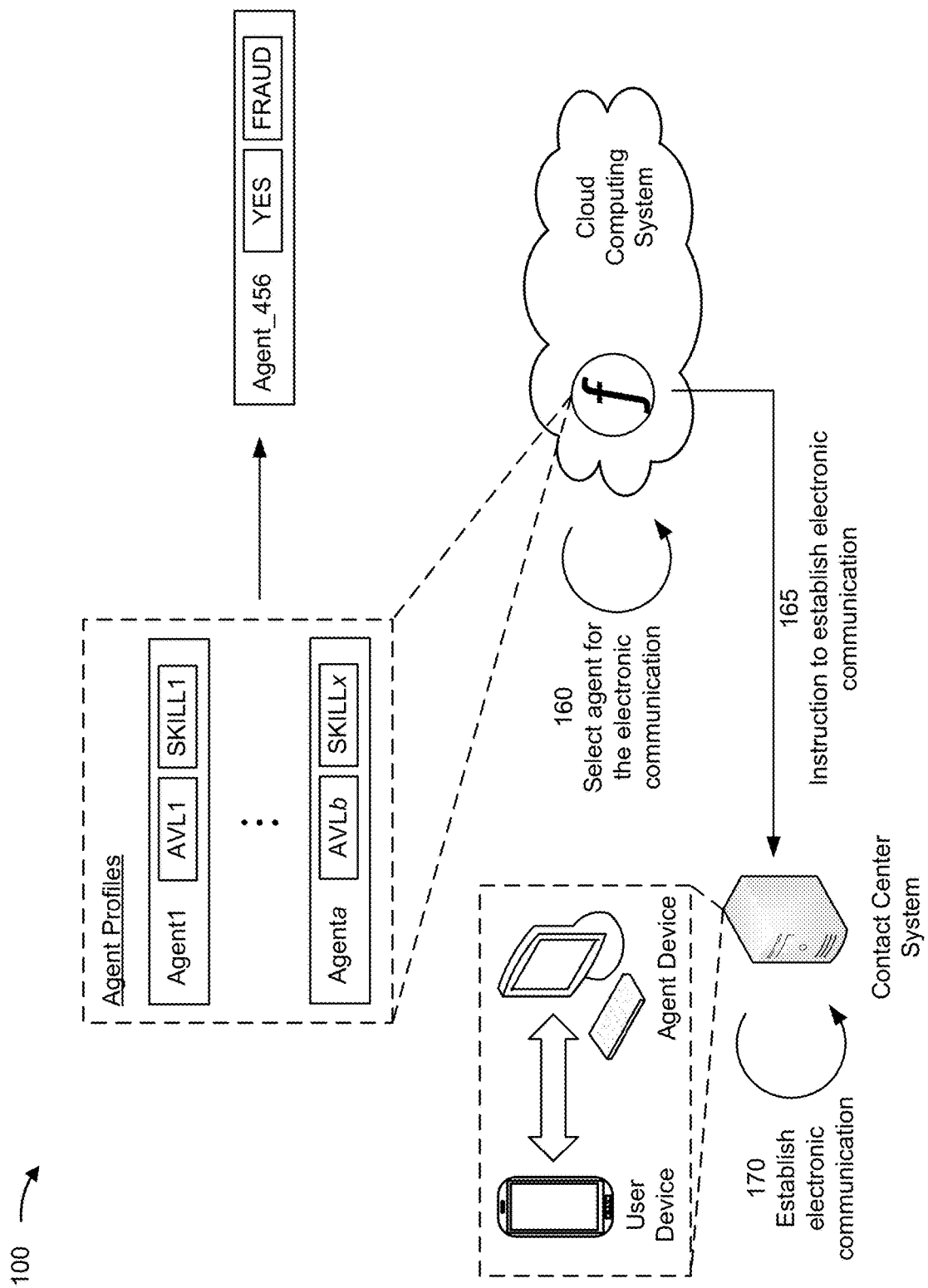

As shown in FIG. 1E, and by reference number 160, the function executing in the cloud computing system may select the agent to be associated with the electronic communication. The function executing in the cloud computing system may select the agent from a plurality of potential agents for the electronic communication based on an association between the agent and the target queue. For example, the function executing in the cloud computing system may select the agent based on an agent profile that indicates the association between the agent and the target queue, a skill set associated with the agent, and a current availability of the agent. The function executing in the cloud computing system may access agent profiles from the contact center system using various application programming interfaces (APIs), such as REST APIs.

In some implementations, the function executing in the cloud computing system may select the agent based on the association between the attributes associated with the electronic communication and attributes associated with the agent. The attributes for each of the plurality of potential agents may be stored in a database that is associated with the contact center system. For example, the function executing in the cloud computing system may compare the attributes associated with the electronic communication (e.g., objective, language, communication mode, and special status) with the attributes associated with each of the plurality of potential agents, and based on the comparison, the function executing in the cloud computing system may identify an agent that is currently available and has similar attributes as the electronic communication. In other words, each of the plurality of potential agents may be associated with different attributes, and the agent having attributes that correspond to the attributes of the electronic communication may be selected to service the customer during the electronic communication between the customer and the agent.

In some implementations, the agent profile may indicate different queues that the agent is capable of servicing. For example, a given agent profile may indicate that an agent is capable of handling a first queue related to fraud reporting for high-value Spanish speakers, as well as a second queue related to fraud reporting for normal-value Spanish speakers.

As an example, the function executing in the cloud computing system may compare the electronic communication having attributes of an objective related to fraud reporting to a plurality of potential agents. Each of the plurality of potential agents may be associated with attributes relating to an availability and skillsets. The function executing in the cloud computing system may identify, based on the comparison, a particular agent that is currently available and is skilled to handle electronic communications related to fraud reporting.

As shown by reference number 165, the function executing in the cloud computing system may transmit, to the contact center system, an instruction to establish the electronic communication between the customer and the agent. The instruction may include an indication of the agent selected to be part of the electronic communication with the customer.

As shown by reference number 170, the contact center system may establish the electronic communication between the user device and the agent device. The contact center system may establish the electronic communication as a voice-based communication, a video-based communication, and/or a text-based communication.

In some implementations, execution of the function on the cloud computing system may be terminated after the instruction to establish the electronic communication between the customer and the agent is transmitted to the contact center system. In other words, the function may be triggered to execute on the cloud computing system for classifying the electronic communication, selecting the target queue based on the electronic communication, and selecting the agent for the electronic communication, at which point the contact center system may take over the electronic communication and the execution of the function on the cloud computing system may be terminated.

Figure 1F:
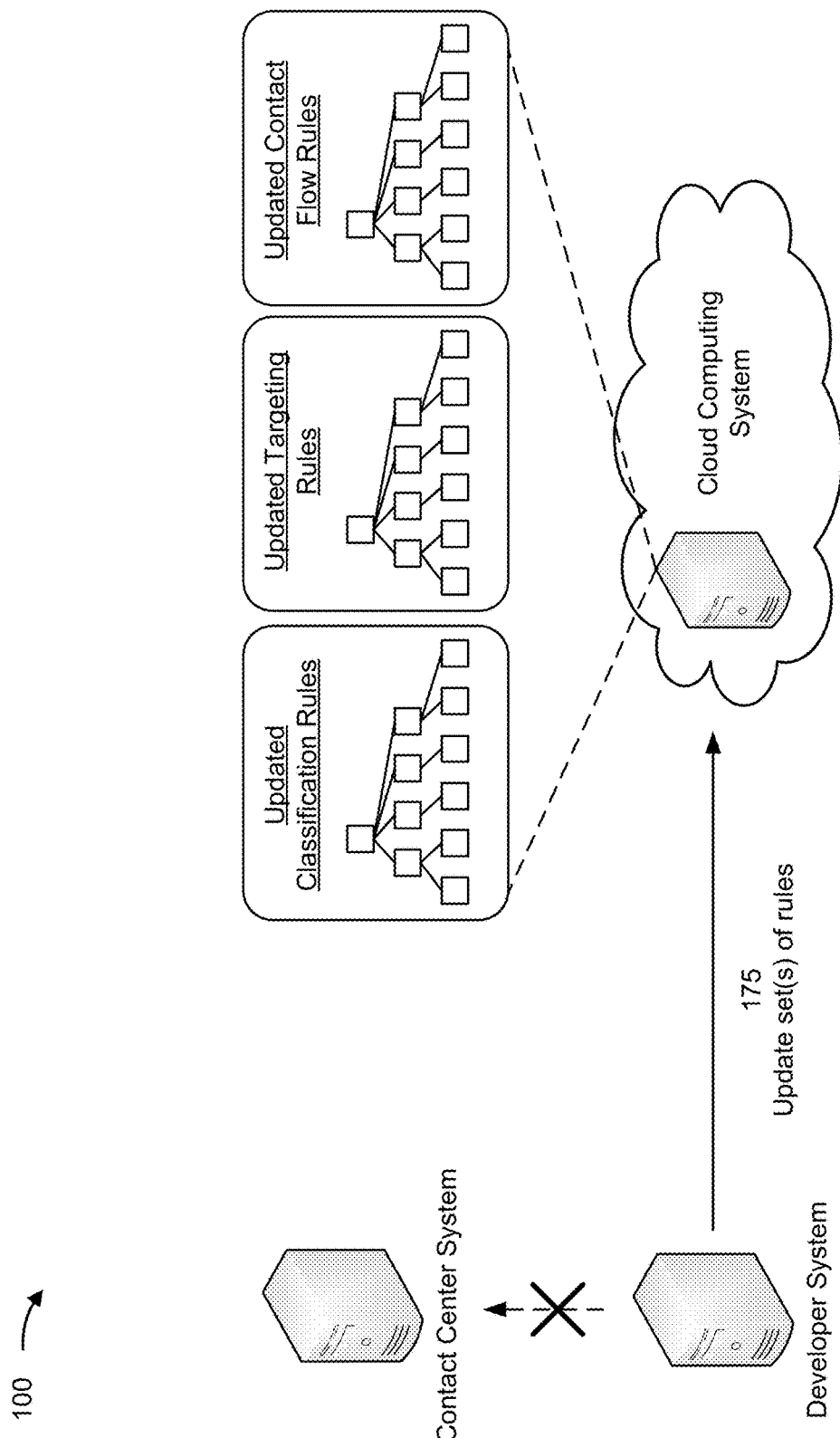

As shown in FIG. 1F and by reference number 175, the developer system may update sets of rules that are stored on the database of the cloud computing system. The developer system may be associated with the client that is using the contact center system to establish the electronic communications between user devices and agent devices. For example, the developer system may access a user interface or portal to dynamically modify the first set of rules, the second set of rules, and/or the third set of rules, as well as the attributes associated with the plurality of potential queues. The developer system may access the user interface to perform modifications while bypassing the contact center system, thereby improving efficiency as changes to the sets of rules and/or attributes may be made directly in the database, as opposed to being made through the contact center system for individual queues.

In some implementations, the developer system may configure, via an interface, the function to be triggered to execute in the cloud computing system based on the initiation of the electronic communication by the user device. The developer system may configure various parameters associated with the triggering of the function to execute in the cloud computing system.

In some implementations, the function executing in the cloud computing system may access, from the database, an updated version of the first set of rules, the second set of rules, and/or the third set of rules. The function executing in the cloud computing system may perform the classification of the electronic communication, the selection of the target queue to be associated with the electronic communication, and/or the selection of the events to occur while the electronic communication is associated with the target queue based on the updated version of the first set of rules, the second set of rules, and/or the third set of rules.

Typically, a contact center system may receive an indication that an electronic communication has been initiated by a user device. The contact center system may be configured with rules for classifying the electronic communication, assigning a queue for the electronic communication, and selecting an agent to take part in the electronic communication. However, with this approach, the rules may be hard-coded into the contact center system, and any updates to be made to the classification and/or targeting rules may be costly from a resource usage standpoint. The updates may need to be applied at each geographic region for each communication type (e.g., call type), and each of the updates may need to be manually tested and validated.

In some implementations, various actions that were previously performed by the contact center system may be externalized to be performed by other cloud computing components, thereby providing a client of the contact center system with greater flexibility when using the contact center system to handle customer service interactions. For example, a function that executes on a cloud computing system may be configured to be triggered based on an initiation of a new electronic communication, and the function executing in the cloud computing system may access an external database (e.g., a database that is associated with the client, but external to the cloud computing system) that stores the various rules and/or attributes for classifying and routing electronic communications to appropriate target queues and agents. In other words, the classification and routing of the electronic communication may be decoupled from the contact center system that maintains the electronic communication between a user device and an agent device, since the function that executes in the cloud computing system and the database may be configured by the client as opposed to the contact center system. As a result, modifications to the rules and/or attributes used for classifying and routing the electronic communications to the appropriate target queues and agents may be more easily accessible, with less resource usage. The modifications to the rules and/or attributes may involve updating configurable items in the database, when may then be auto-replicated across different geographic regions.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
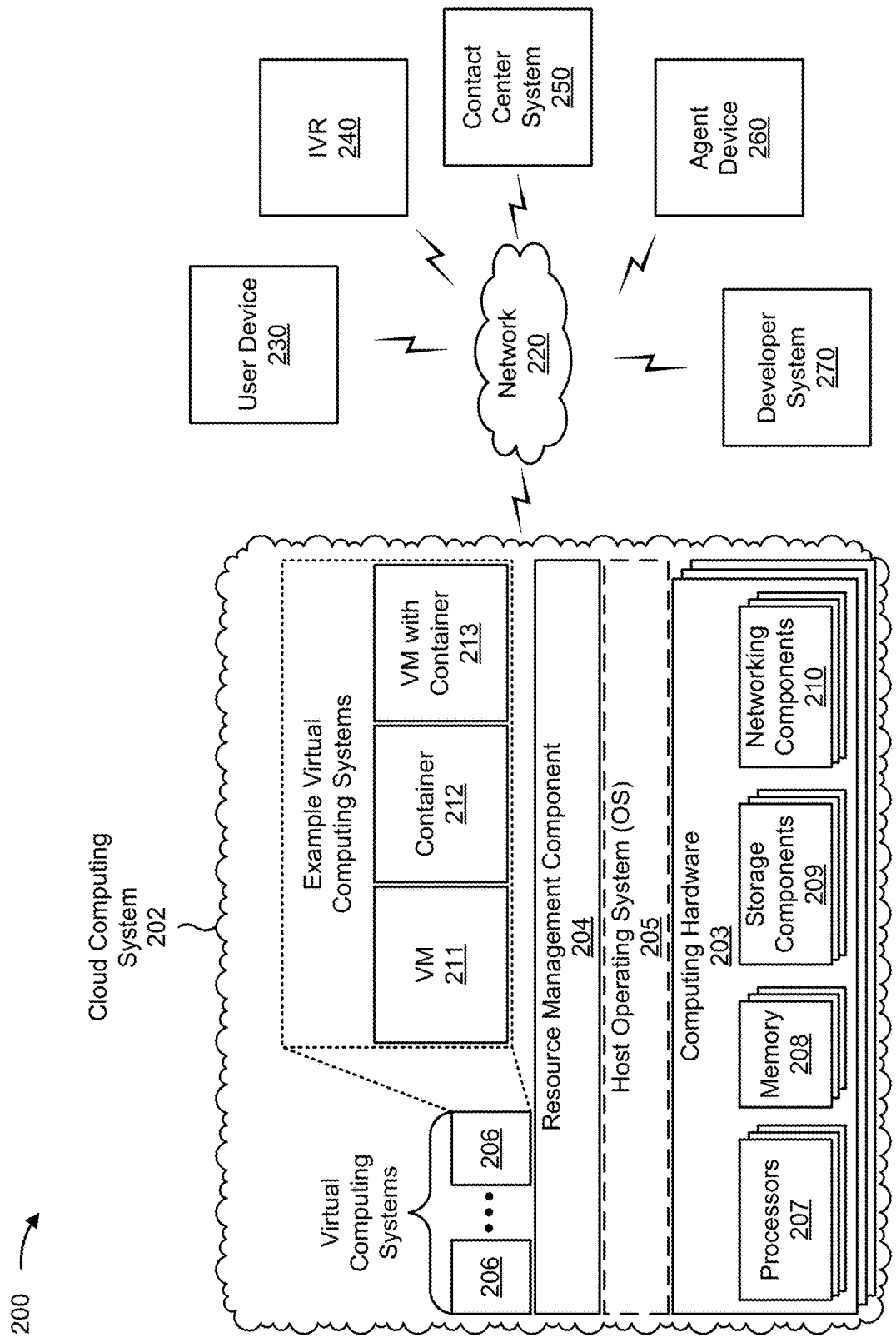
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a cloud computing system 202. The cloud computing system 202 may include one or more elements 203-213, as described in more detail below. As further shown in FIG. 2, environment 200 may include a network 220, a user device 230, an IVR system 240, a contact center system 250, an agent device 260, and/or a developer system 270. Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The resource management component 204 may perform virtualization (e.g., abstraction) of computing hardware 203 to create the one or more virtual computing systems 206. Using virtualization, the resource management component 204 enables a single computing device (e.g., a computer, a server, and/or the like) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, or a hosted or Type 2 hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, a hybrid environment 213 that includes a virtual machine and a container. A virtual computing system 206 may execute one or more applications using a file system that includes binary files, software libraries, and/or other resources required to execute applications on a guest operating system (e.g., within the virtual computing system 206) or the host operating system 205.

Although the cloud computing system 202 may include one or more elements 203-213, which may execute within the cloud computing system 202, and/or may be hosted within the cloud computing system 202, in some implementations, the cloud computing system 202 may not be cloud-based (e.g., may be implemented outside of a cloud computing system) or may be partially cloud-based. For example, the cloud computing system 202 may include one or more devices, such as device 300 of FIG. 3, which may include a standalone server or another type of computing device. The cloud computing system 202 may perform one or more operations and/or processes described in more detail elsewhere herein.

Network 220 includes one or more wired and/or wireless networks. For example, network 220 may include a cellular network, a public land mobile network (PLMN), a local area network (LAN), a wide area network (WAN), a metropolitan area network, a telephone network, a private network, the Internet, and/or the like, and/or a combination of these or other types of networks. The network 220 enables communication among the devices of environment 200.

The user device 230 includes one or more devices capable of receiving, generating, storing, processing, and/or providing information associated with selecting a target queue for an electronic communication, as described elsewhere herein. The user device 230 may include a communication device and/or a computing device. For example, the user device 230 may include a wireless communication device, a phone such as a smart phone, a mobile phone or a video phone, a user equipment, a laptop computer, a tablet computer, a desktop computer, a television, a gaming console, or a similar type of device.

The IVR system 240 includes one or more devices capable of receiving, generating, storing, processing, providing, and/or routing information associated with selecting a target queue for an electronic communication, as described elsewhere herein. The IVR system 240 may include a communication device and/or a computing device. For example, the IVR system 240 may include a server, such as an application server, a client server, a web server, a database server, a host server, a proxy server, a virtual server (e.g., executing on computing hardware), or a server in a cloud computing system. In some implementations, the IVR system 240 includes computing hardware used in a cloud computing environment.

The contact center system 250 includes one or more devices capable of receiving, generating, storing, processing, providing, and/or routing information associated with selecting a target queue for an electronic communication, as described elsewhere herein. The contact center system 250 may include a communication device and/or a computing device. For example, the contact center system 250 may include a server, such as an application server, a client server, a web server, a database server, a host server, a proxy server, a virtual server (e.g., executing on computing hardware), or a server in a cloud computing system. In some implementations, the contact center system 250 includes computing hardware used in a cloud computing environment.

The agent device 260 includes one or more devices capable of receiving, generating, storing, processing, and/or providing information associated with selecting a target queue for an electronic communication, as described elsewhere herein. The agent device 260 may include a communication device and/or a computing device. For example, the agent device 260 may include a wireless communication device, a phone such as a smart phone, a mobile phone or a video phone, a user equipment, a laptop computer, a tablet computer, a desktop computer, a television, a gaming console, or a similar type of device.

The developer system 270 includes one or more devices capable of receiving, generating, storing, processing, providing, and/or routing information associated with selecting a target queue for an electronic communication, as described elsewhere herein. The developer system 270 may include a communication device and/or a computing device. For example, the developer system 270 may include a server, such as an application server, a client server, a web server, a database server, a host server, a proxy server, a virtual server (e.g., executing on computing hardware), or a server in a cloud computing system. In some implementations, the developer system 270 includes computing hardware used in a cloud computing environment.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
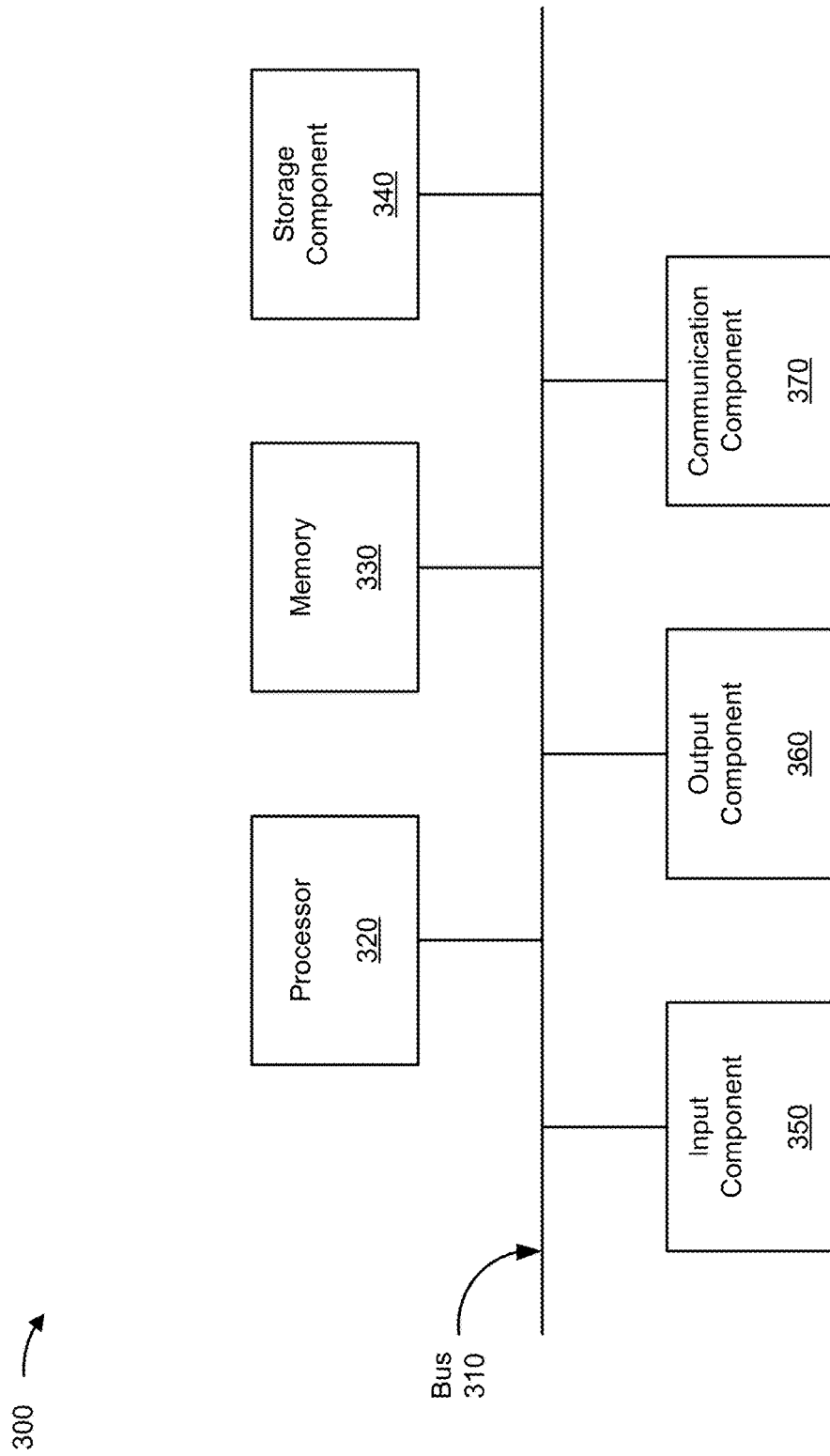
FIG. 3 is a diagram of example components of one or more devices of FIG. 2.

FIG. 3 is a diagram of example components of a device 300, which may correspond to the user device 230, the IVR system 240, the contact center system 250, the agent device 260, and/or the developer system 270. In some implementations, the user device 230, the IVR system 240, the contact center system 250, the agent device 260, and/or the developer system 270 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 400 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 400 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
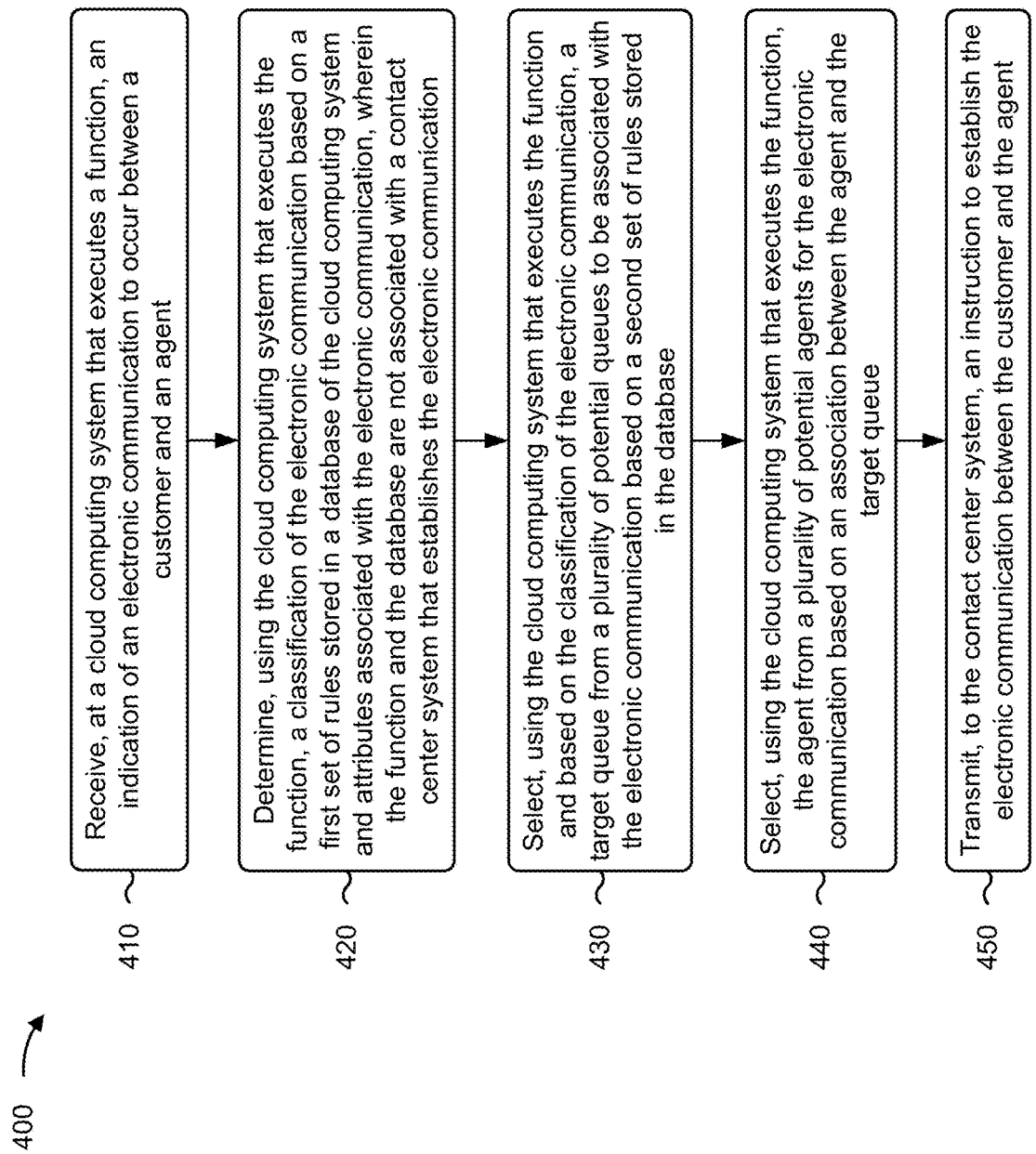
FIG. 4 is a flowchart of an example process relating to [selecting a target queue for an electronic communication].

FIG. 4 is a flowchart of an example process 400 associated with selecting a target queue for an electronic communication. In some implementations, one or more process blocks of FIG. 4 may be performed by a cloud computing system (e.g., cloud computing system 202). In some implementations, one or more process blocks of FIG. 4 may be performed by another device or a group of devices separate from or including the cloud computing system, such as user device 230, IVR system 240, contact center system 250, agent device 260, and/or developer system 270. Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving, at a cloud computing system that executes a function, an indication of an electronic communication to occur between a customer and an agent (block 410). As further shown in FIG. 4, process 400 may include determining, using the cloud computing system that executes the function, a classification of the electronic communication based on a first set of rules stored in a database of the cloud computing system and attributes associated with the electronic communication (block 420). The function and the database are not associated with a contact center system that establishes the electronic communication. As further shown in FIG. 4, process 400 may include selecting, using the cloud computing system that executes the function and based on the classification of the electronic communication, a target queue from a plurality of potential queues to be associated with the electronic communication based on a second set of rules stored in the database (block 430). As further shown in FIG. 4, process 400 may include selecting, using the cloud computing system that executes the function, the agent from a plurality of potential agents for the electronic communication based on an association between the agent and the target queue (block 440). As further shown in FIG. 4, process 400 may include transmitting, to the contact center system, an instruction to establish the electronic communication between the customer and the agent (block 450).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first device, comprising:
one or more memories; and
one or more processors, coupled to the one or more memories, configured to:
determine, based on a first set of rules, and based on receiving an indication associated with initiating communication between a device associated with a customer and another device associated wwith an agent, a classification associated with an objective related to the communication and associated with a feature related to the customer;

select, based on a second set of rules, based on the objective, and based on the feature, a queue, from a plurality of queues, to be associated with the communication;

transmit, to a second device associated with establishing the communication, information associated with an event to occur while the communication is associated with the queue;

select, based on an association between the agent and the queue, the agent from a plurality of agents; and transmit, to the second device, an instruction to establish the communication between the device associated with the customer and the other device associated with the agent.

2. The first device of claim 1, wherein selecting the queue is further based on real-time information indicating lengths of the plurality of queues.

3. The first device of claim 1, wherein the agent is selected based on an agent profile that indicates at least one of:
the association between the agent and the queue,
a skill set associated with the agent, or
information associated with availability of the agent.

4. The first device of claim 1, wherein a particular process is triggered to execute based on receiving the indication associated with initiating the communication, and
wherein the one or more processors are further configured to:
terminate execution of the particular process based on transmitting the instruction to establish the communication.

5. The first device of claim 1, wherein the communication is at least one of:
a voice-based communication,
a video-based communication, or
a text-based communication.

6. The first device of claim 1, wherein the first set of rules and the second set of rules are stored in a database that is external to the second device.

7. The first device of claim 1, wherein the first device is a cloud computing system, and
wherein the second device is a contact center system.

8. A method, comprising:
determining, by a first device, based on a first set of rules, and based on receiving an indication associated with initiating communication between a device associated with a customer and another device associated with an agent, a classification associated with an objective related to the communication and associated with a feature related to the customer;

selecting, by the first device, based on a second set of rules, based on the objective, and based on the feature, a queue, from a plurality of queues, to be associated with the communication;

transmitting, by the first device, to a second device associated with establishing the communication, information associated with an event to occur while the communication is associated with the queue;

selecting, by the first device and based on an association between the agent and the queue, the agent from a plurality of agents; and transmitting, by the first device, and to the second device, an instruction to establish the communication between the device associated with the customer and the other device associated with the agent.

9. The method of claim 8, wherein selecting the queue is further based on real-time information indicating lengths of the plurality of queues.

10. The method of claim 8, wherein the agent is selected based on an agent profile that indicates at least one of:
the association between the agent and the queue,
a skill set associated with the agent, or
information associated with availability of the agent.

11. The method of claim 8, wherein a particular process is triggered to execute based on receiving the indication associated with initiating the communication, and
further comprising:
terminating execution of the particular process based on transmitting the instruction to establish the communication.

12. The method of claim 8, wherein the communication is at least one of:
a voice-based communication,
a video-based communication, or
a text-based communication.

13. The method of claim 8, wherein the first set of rules and the second set of rules are stored in a database that is external to the second device.

14. The method of claim 8, wherein the first device is a cloud computing system, and
wherein the second device is a contact center system.

15. A non-transitory computer-readable medium storing a set of instructions, the set of instructions comprising:
one or more instructions that, when executed by one or more processors of a first device, cause the first device to:
determine, based on a first set of rules, and based on receiving an indication associated with initiating communication between a device associated with a customer and another device associated with an agent, a classification associated with an objective related to the communication and associated with a feature related to the customer;

select, based on a second set of rules, based on the objective, and based on the feature, a queue, from a plurality of queues, to be associated with the communication;

transmit, to a second device associated with establishing the communication, information associated with an event to occur while the communication is associated with the queue;

select, based on an association between the agent and the queue, the agent from a plurality of agents; and transmit, to the second device, an instruction to establish the communication between the device associated with the customer and the other device associated with the agent.

16. The non-transitory computer-readable medium of claim 15, wherein selecting the queue is further based on real-time information indicating lengths of the plurality of queues.

17. The non-transitory computer-readable medium of claim 15, wherein the agent is selected based on an agent profile that indicates at least one of:
the association between the agent and the queue,
a skill set associated with the agent, or
information associated with availability of the agent.

18. The non-transitory computer-readable medium of claim 15, wherein a particular process is triggered to execute based on receiving the indication associated with initiating the communication, and
- wherein the one or more instructions, when executed by the one or more processors, further cause the first device to:
  - terminate execution of the particular process based on transmitting the instruction to establish the communication.

19. The non-transitory computer-readable medium of claim 15, wherein the first set of rules and the second set of rules are stored in a database that is external to the second device.

20. The non-transitory computer-readable medium of claim 15, wherein the first device is a cloud computing system, and
- wherein the second device is a contact center system.

* * * * *